United States Patent [19]
Honda et al.

[11] Patent Number: 6,040,666
[45] Date of Patent: Mar. 21, 2000

[54] MACHINE TOOL CONTROL SYSTEM AND MACHINE TOOL CONTROL METHOD, AND DETECTION SYSTEM AND DETECTION METHOD THEREFOR

[75] Inventors: Hirohiko Honda; Yoshinobu Kato, both of Shizuoka-ken, Japan

[73] Assignee: Toshiba Kikai Kabushiki Kaisha, Tokyo, Japan

[21] Appl. No.: 09/126,108

[22] Filed: Jul. 30, 1998

[30] Foreign Application Priority Data

Jul. 31, 1997 [JP] Japan .................................. 9-220252

[51] Int. Cl.[7] ...................................................... H02P 1/00
[52] U.S. Cl. ......................... 318/276; 318/434; 318/779; 318/433; 318/848; 318/568.21; 318/570; 318/64; 318/90; 318/278; 364/565
[58] Field of Search ..................................... 318/434, 779, 318/433, 848, 568.21, 570, 64, 90, 276, 278; 364/565

[56] References Cited

U.S. PATENT DOCUMENTS

| | | | |
|---|---|---|---|
| 4,132,368 | 1/1979 | Schiess et al. | 318/434 |
| 5,194,793 | 3/1993 | Niimi | 318/570 |
| 5,682,334 | 10/1997 | Plutowski et al. | 318/434 |
| 5,834,913 | 11/1998 | Yoshida et al. | 318/270 |

*Primary Examiner*—Karen Masih
*Attorney, Agent, or Firm*—Finnegan, Henderson, Farabow, Garrett & Dunner, L.L.P.

[57] ABSTRACT

A machine tool has a spindle with a tooling body mounted thereon, a detector for detecting an acceleration time for the tooling body to reach from a rotation start to a predetermined rpm, a controller for controlling an rpm of the spindle under a lowered limit when the acceleration time is longer than a reference time. Another detector detects an asymmetricity of radial forces acting on the spindle, and the controller controls the rpm of the spindle under a lowered limit when the asymmetricity of radial forces exceeds a reference degree.

6 Claims, 7 Drawing Sheets

MACHINE TOOL CONTROL SYSTEM AND MACHINE TOOL CONTROL METHOD, AND DETECTION SYSTEM AND DETECTION METHOD THEREFOR

BACKGROUND OF THE INVENTION

1. Field of the Invention

The present invention relates to a machine tool control system and a machine tool control method and a detection system and a detection method therefor, and particularly, it relates to a control system and a control method for a machine tool including a main spindle with a tool or a combination of a tool and a holder (hereafter collectively "tooling body") mounted thereon, as well as to a detection system and a detection method for the same.

2. Description of Relevant Art

In numerical control (hereafter simply "NC") machine tools, the main spindle includes a tooling body mounted thereon, as it is selected by a machine operator or an NC programmer to effect a voluntary processing, and has its number of revolutions per unit time, generally per minute, (hereafter "rpm") instructed by the operator or programmer.

When the main spindle is driven to rotate, the tooling body mounted thereon has its energy of rotation.

If the selected tooling body has a large moment of inertia (hereafter sometimes simply "inertia"), the magnitude of rotation energy may increase to an uncontrollable level, as the rpm becomes large. Accordingly, the rpm is controlled under a limit.

If the inertia is very large, the magnitude of rotation energy may go uncontrollable under the limit. If the instructed rpm were inappropriate, the machine tool might have been damaged or the operator might have felt a fear. Therefore, the operator as well as the programmer has a great concern to the inertia of the selected tooling body.

Further, the selected tooling body maybe asymmetric about a rotation axis in configuration, weight, material or product substance. The asymmetry may cause an asymmetric generation of centrifugal forces, with an increasing tendency to develop an acentric rotation, as the rpm of the spindle increases.

However, no convenient measures are available to know the moment of inertia and/or check for an asymmetry of the selected tooling body.

SUMMARY OF THE INVENTION

The present invention has been achieved with such points in view.

It therefore is an object of the present invention to provide a control system and a control method for a machine tool having a convenient measures for detecting a moment of inertia and/or asymmetry of a tooling body mounted on a spindle of the machine tool, as well as a detection system and a detection method therefor, permitting an adequate drive control during acceleration of the spindle, preventing an undue rpm, keeping an operator safe, and protecting the machine tool from being damaged.

To achieve the object described, a first aspect of the invention provides a control system for a machine tool having a spindle with a tooling body mounted thereon, the control system comprising a first detector for detecting an acceleration time for the tooling body to reach from a rotation start to a predetermined rpm, and a controller for controlling an rpm of the spindle under a first lowered limit when the acceleration time is longer than a reference time.

According to the first aspect of the invention, a tooling body rotating together with a spindle has an acceleration time in dependence on a moment of inertia thereof. In other words, a first detector or a software detector detects the moment of inertia in. terms of the acceleration time. If the acceleration time is long, the moment of inertia is large. Hence, when the detected acceleration time is longer than a predetermined reference time, a controller controls an rpm of the spindle under a first lowered limit, i.e., an upper limit lowered from a standard upper limit.

Accordingly, a machine tool has a convenient measures for detecting a moment of inertia of a tooling body mounted on a spindle of the machine tool, permitting an adequate drive control during acceleration of die spindle, preventing an undue rpm, keeping an operator safe, and protecting the machine tool from being damaged.

According to a second aspect of the invention, a second detector detects an asymmetricity of radial forces acting on the spindle, and the controller controls the rpm of the spindle under a second lowered limit when the asymmetricity of radial forces exceeds a reference degree.

According to the second aspect of the invention, a second detector detects an asymmetricity of the tooling body in terms of an asymmetricity of radial forces acting on the spindle. And, if the detected asymmetricity exceeds a predetermined reference degree of asymmetry, the controller controls the rpm of the spindle under a second lowered limit, i.e., an initially or additionally lowered upper limit.

Accordingly, the machine tool has a convenient measures for detecting an asymmetry of the tooling body mounted on the spindle, permitting an adequate drive control, preventing an undue rpm, keeping an operator safe, and protecting the machine tool from being damaged.

Moreover, to achieve another exemplary object of the present invention, a third aspect of the invention provides a control method for a machine tool having a spindle with a tooling body mounted thereon, the control method comprising the steps of detecting an acceleration time for the tooling body to reach from a rotation start to a predetermined rpm, and controlling an rpm of the spindle under a first lowered limit when the acceleration time is longer than a reference time.

According to a fourth aspect of the invention, the control method further comprises the steps of detecting an asymmetricity of radial forces acting on the spindle, and controlling the rpm of the spindle under a second lowered limit when the asymmetricity of radial forces exceeds a reference degree.

Further, to achieve a further exemplary object of the present invention, a fifth aspect of the invention provides a detection system for control of a machine tool having a spindle with a tooling body mounted thereon, the detection system comprising a first detector for detecting a moment of inertia of the tooling body in terms of an acceleration time for the tooling body to reach from a rotation start to a predetermined rpm, and a first comparator for comparing the acceleration time with a reference time for a decision on a magnitude of the moment of inertia.

According to a sixth aspect of the invention, the detection system further comprises a second detector for detecting an asymmetricity of the tooling body in terms of an asymmetricity of radial forces acting on the spindle, and a second comparator for comparing the asymmetricity of radial forces with a reference degree for a decision on a degree of asymmetry of the tooling body.

Furthermore, to achieve yet another exemplary object of the present invention, a seventh aspect of the invention provides a detection method for control of a machine tool having a spindle with a tooling body mounted thereon, the detection method comprising the steps of detecting a moment of inertia of the tooling body in terms of an acceleration time for the tooling body to reach from a rotation start to a predetermined rpm, and comparing the acceleration time with a reference time for a decision on magnitude of the moment of inertia.

According to an eighth exemplary aspect of the invention, the present detection method further comprises the steps of detecting an asymmetricity of the tooling body in terms of an asymmetricity of radial forces acting on the spindle, and comparing the asymmetricity of radial forces with a reference degree for a decision on a degree of asymmetry of the tooling body.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
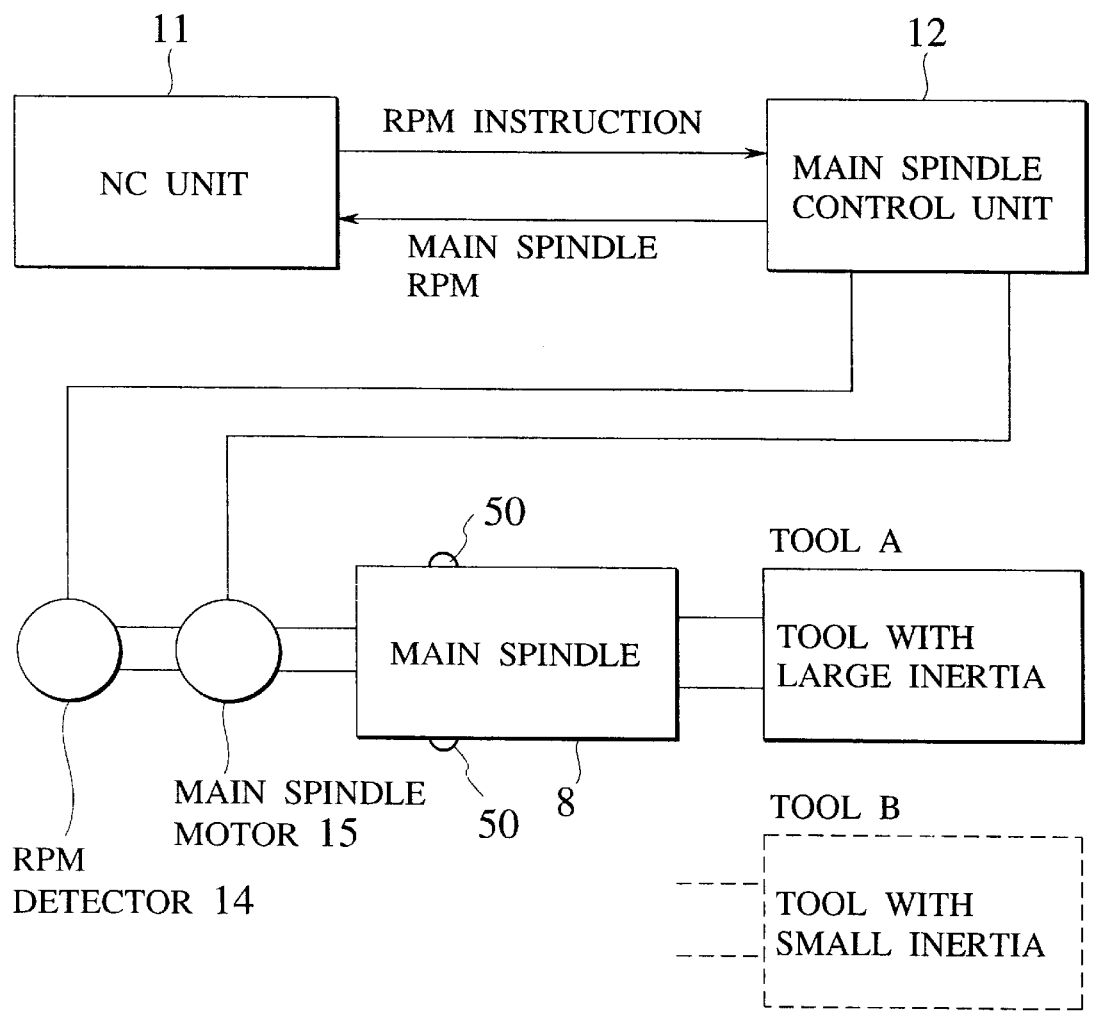
FIG. 1 is a block diagram of a machine tool control system according to an embodiment of the invention.

There will be detailed below the preferred embodiments of the present invention with reference to the accompanying drawings. Like members are designated by like reference character.

Figure 4:
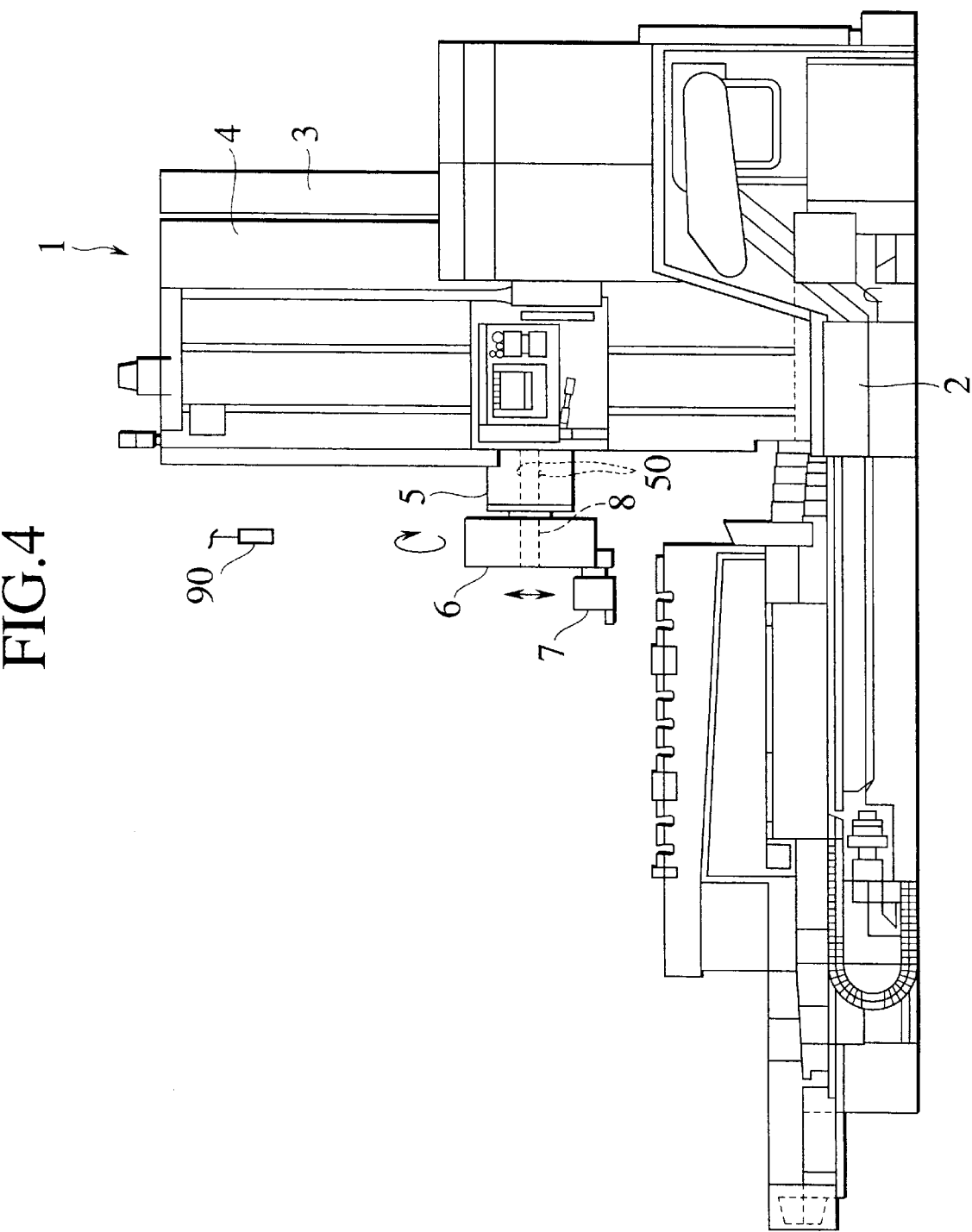
FIG. 4 is an elevation of a machine tool having the control system of FIG. 1.

FIG. 4 shows an entirety of a machine tool 1 having a control system according to an embodiment of the invention. The machine tool 1 includes a column 3 standing on a bed 2 thereof, which column 3 has on a column sliding surface 4 thereof a spindle head 5 vertically movably fitted thereto. At an end of a main spindle 8 of the spindle head 5 is mounted a disc face plate 6 having a tool 7 fastened thereto. The tool 7 may be directly fastened to the spindle 8. The disc face plate 6 is driven to rotate by a drive.

FIG. 1 shows the control system according to the embodiment, which controls rotation of the main spindle 8. With a rotation start command and a preset rpm instruction input from an NC unit 11 of the machine tool 1, a main spindle control unit 12 controls a main spindle motor 15 for driving the main spindle 8 to start rotation, to be accelerated and controlled as programmed. An rpm of the main spindle 8 is detected by a detector 14, which is operatively connected to a drive shaft of the spindle motor 15 coupled to the spindle 8. The detector 14 outputs a detection signal representative of the rpm of the main spindle 8, through the main spindle control unit 12 to the NC unit 11, where the rpm is supervised as a variation depending on a lapse of time from the rotation start command.

The NC unit 1 performs a comparison between a predetermined reference time and an acceleration time T detected by calculation in the NC unit 1 as an interval of time required for the spindle 8 to reach from a rotation start to a preset rpm for a check. If the acceleration time T is larger than the reference time, a decision is made such that an associated tooling body (=the disc 6+the tool 7) has a relatively large moment of inertia (like tool A in FIG. 1). If the acceleration time T is smaller than the reference time, another decision is made such that an associated tooling body (=the tool 7) has a relatively small moment of inertia (like tool B in FIG. 1). In the case the tooling body 6+7 has a large moment of inertia, the NC unit 11 outputs an instruction to the main spindle control unit 12 for restricting an rpm control range of the main spindle 8 under an upper limit ($1^{st}$ limit in FIG. 2 lowered from a normal upper limit applicable to small moments of inertia.

Figure 2:
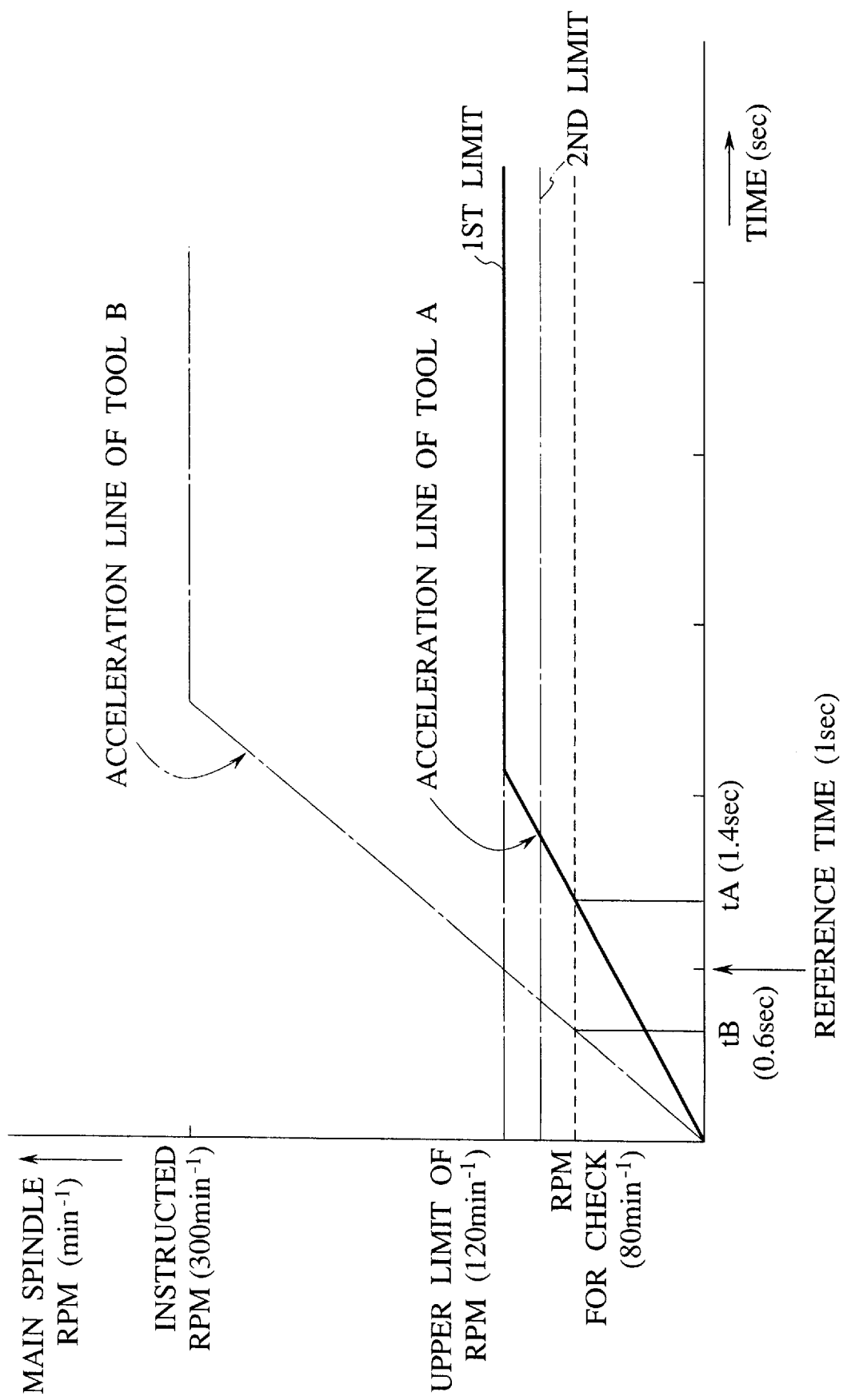
FIG. 2 is a time chart describing actions of the control system of FIG. 1.
Figure 3:
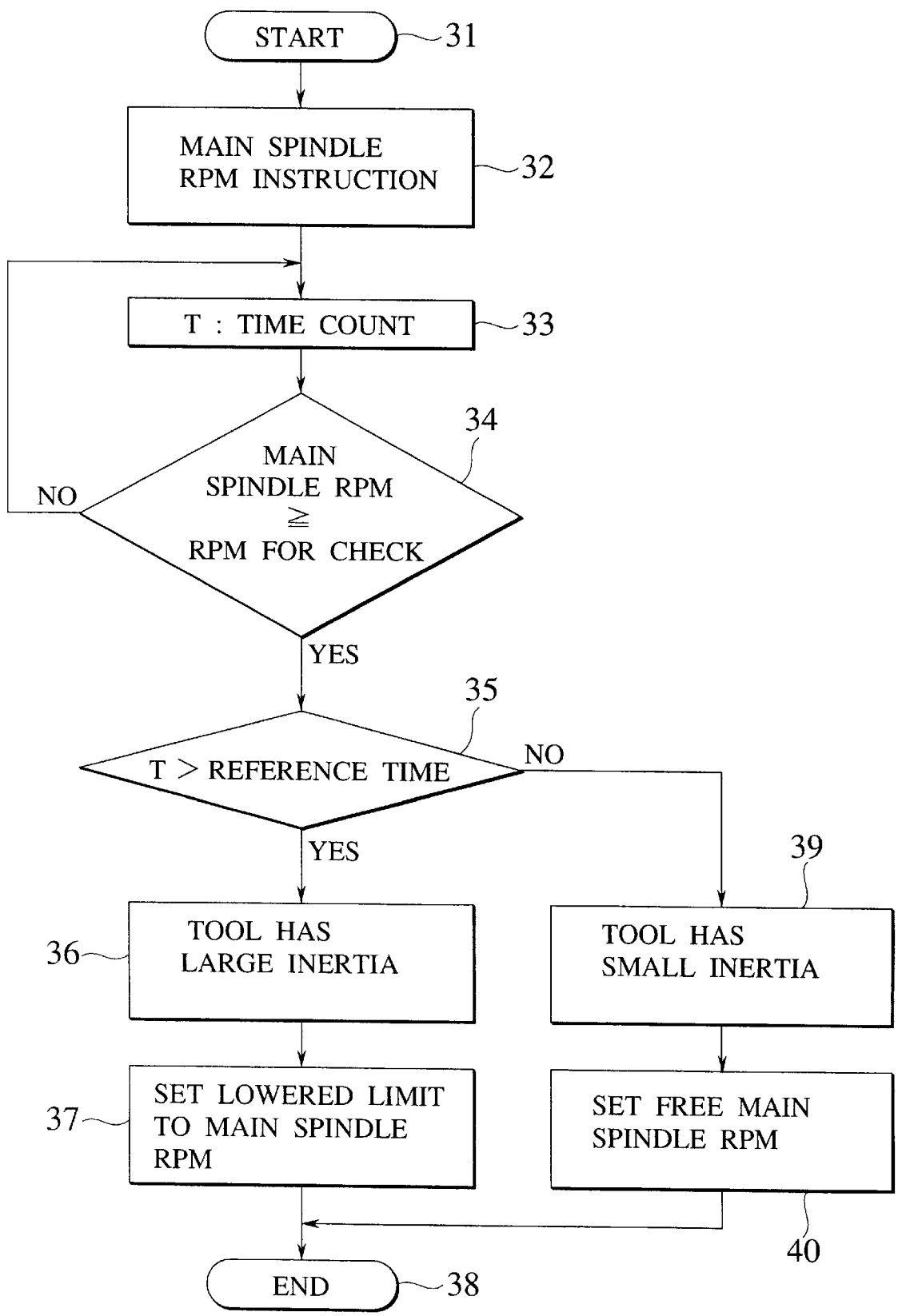
FIG. 3 is a flowchart of a control routine of the control system of FIG. 1.

There will be described two cases of rotation control with reference to FIGS. 2 and 3. In one case, the spindle B has mounted thereon a tool A that is comprised of the tooling body 6+7 and has a large moment of inertia. In the other case, the spindle 8 has tool B that consists of the tooling body 7 and has a small moment of inertia. FIG. 2 shows variations of respective rpms of the tools A and B relative to a lapse time from the rotation start of the main spindle 8. FIG. 3 shows a control flow diagram of the control system of FIG. 1

In the case of tool A, a control flow starts at a step 31. At a step 32, a main spindle rotation start command is output together with an rpm instruction to the main spindle control unit 12, when a software counter of the acceleration time T is set to a 0, while the reference time is preset and stored as a time interval of one second. The instruction represents an upper limit of rpm and is stored. Then, the main spindle 8 starts rotation, and the counter starts counting from the 0. At a step 33, the time count is kept on. At a step 34, an rpm of the spindle 8 is checked if it has exceeded a preset and stored rpm of 80 revolutions per minute. Unless it has exceeded the preset rpm, the flow goes to the step 33. When an excessive rpm is checked, a current count of the counter is stored as the acceleration time T. At a step 35, the acceleration time T is compared with the preset reference time. In this case, the acceleration time T equals an interval of 1.4 seconds, exceeding the reference time of 1 second, and the flow goes to a step 36, where a decision is made such that the tool A has a large moment of inertia. Then, at a step 37, an upper limit of rpm is lowered from a standard limit of 300 turns per minute (instructed by the instruction at the step 32) to a first limit of 120 turns per minute. The flow ends at a step 38.

In the case of tool B, a control flow starts at the step 31. At the step 32, the start command and the rpm instruction are output to the main spindle control unit 12, when the acceleration time counter is set to a 0 while the reference time is preset to one second. The spindle 8 starts rotation, and the counter starts counting. At the step 33, the time count is kept on. At the step 34, an rpm of the spindle 8 is checked for an excess relative to the preset rpm of 80 revolutions per minute. When an excess is checked, a current count is stored as the acceleration time T. At the step 35, this time T is compared with the preset reference time. In this case, the acceleration time T equals an interval of 0.6 seconds failing to exceed the reference time, and the flow goes to a step 39, where a decision is made such that the tool B has a small moment of inertia. Then, at a step 40, the rpm is set free from the $1^{st}$ limit, while it is still controlled to be under the instructed limit of 300 turns per minute. The flow ends at the step 38.

As shown in FIGS. 1 and 4, the main Spindle 8 has a plurality of detectors 50 symmetrically put thereon in an equal-angularly spaced manner along a circumferential part vicinal to a rear bearing of the spindle 8, for detecting an asymmetricity of the tooling body 6 or 6+7 about an axial axis of the spindle 8 in terms of a degree of asymmetry of radial forces acting thereon when the spindle 8 is rotated together with the tooling body. If the detected asymmetricity is large, the instructed rpm (upper limit for tool B) of FIG. 2 or the $1^{st}$ limit (upper limit for tool A) is lowered to a $2_{nd}$ limit.

A respective detector 50 may comprise a strain gauge responsive to a strain of an associated sector element of the circumferential part of the spindle 8 to output an electric signal representative of a magnitude and a direction of an associated stress, or a piezoelectric element contacting a surface of an associated sector element of the circumferential part to output an electric signal representative of a pressure exerted thereon by the spindle 8.

The asymmetricity may be estimated in terms of a magnitude of a vector sum of stresses or pressures detected by the plurality of detectors 50, and may be detected with respect to any and all factors relating to a mass distribution in the tooling body.

Figure 5:
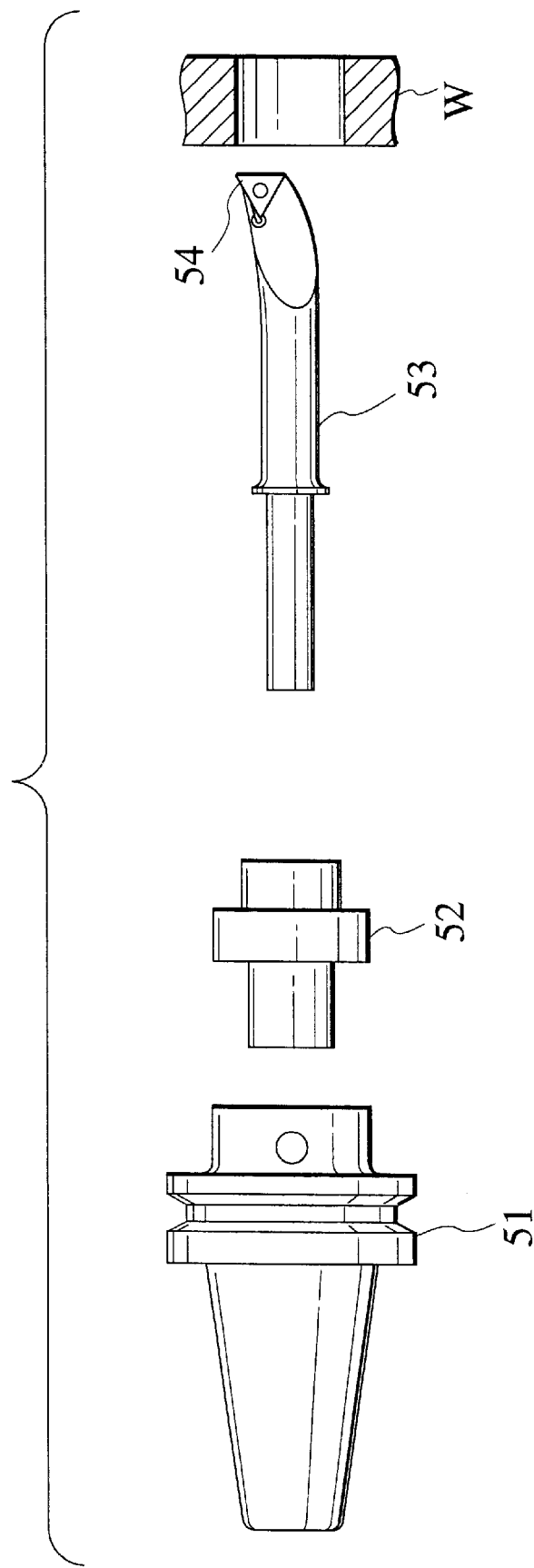
FIG. 5 is an exploded view of a tooling body applicable to the machine tool of FIG. 4.
Figure 6:
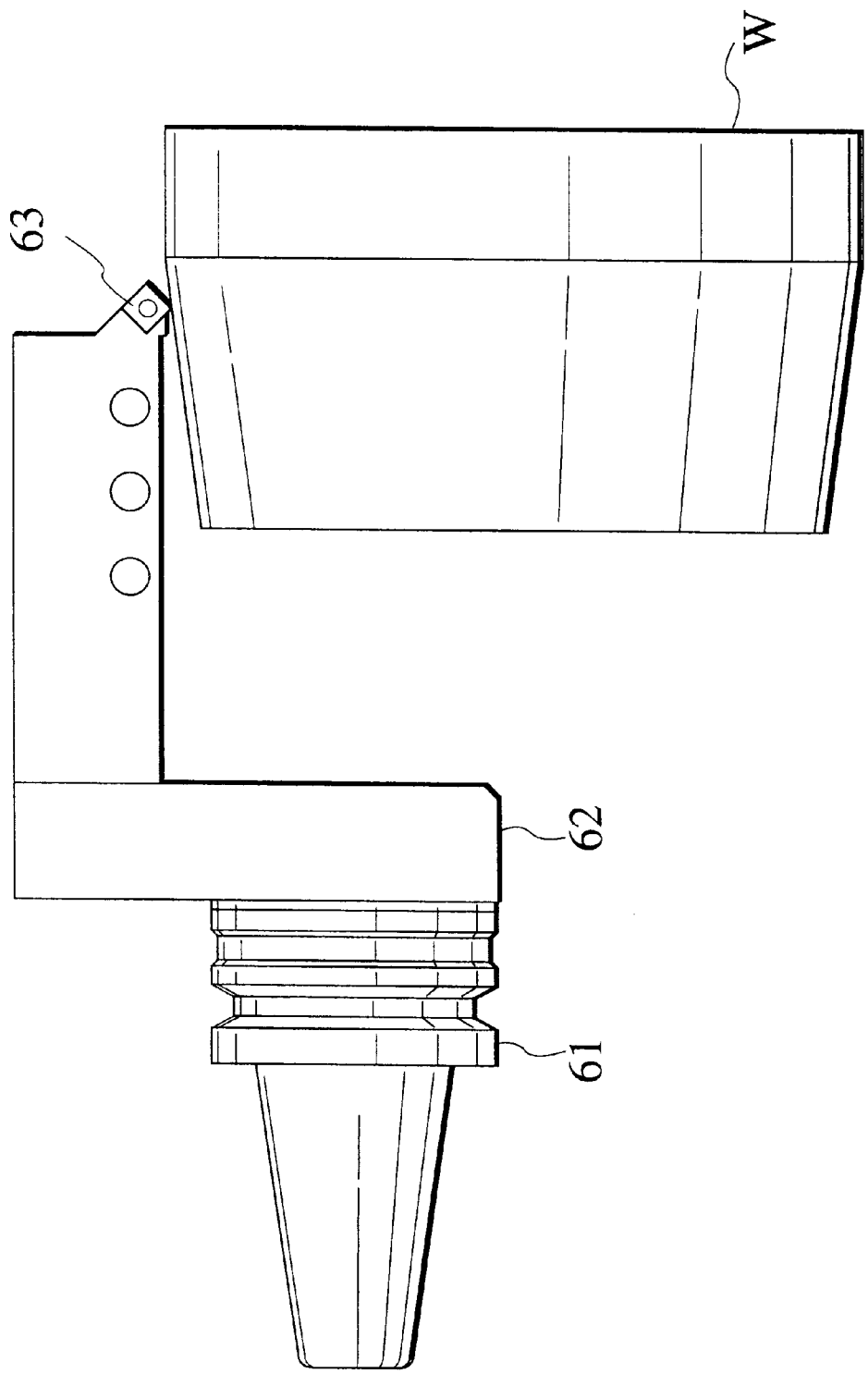
FIG. 6 is a side view of another tooling body applicable to the machine tool of FIG. 4.

FIG. 5 shows an exemplary tooling body relatively small of asymmetricity, and FIG. 6, an exemplary tooling body relatively large of asymmetricity.

The tooling body of FIG. 5 comprises a modular holder 51, a side lock adapter 52, and a bite 53 with an offset cutting tip 54 for cutting a work piece W. The tooling body of FIG. 6 comprises a balling ring 61, and an angle bite 62 with a cutting tip 63 for cutting a work piece W.

Figure 7:
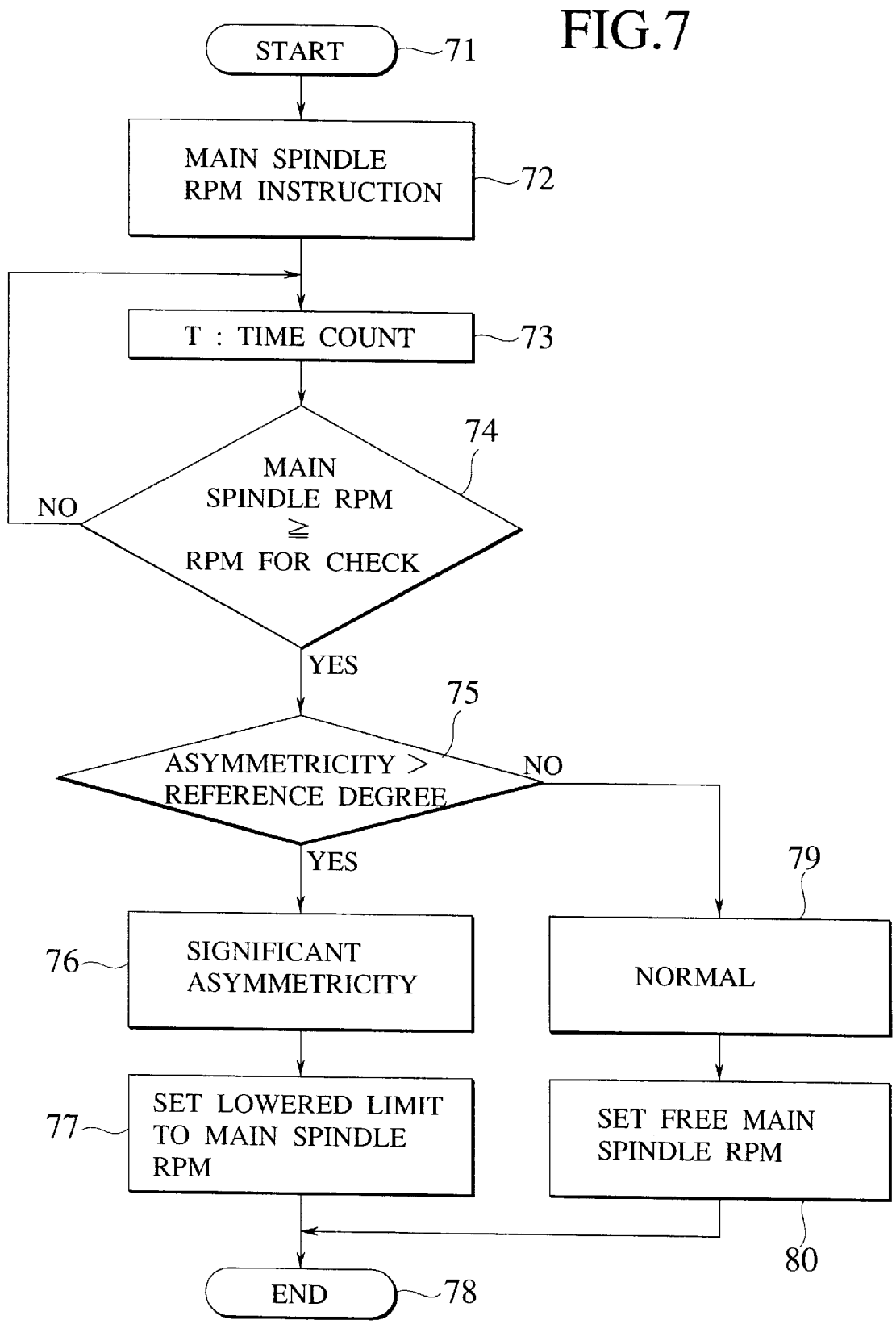
FIG. 7 is a flowchart of another control routine of the control system of FIG. 1.

FIG. 7 shows a control flow of the control system of FIG. 1, as the detectors 50 are electrically connected to the NC unit 11.

The control flow starts at a step 71. At a step 72, a main spindle rotation start command is output together with an rpm instruction to the main spindle control unit 12, when a software counter of the acceleration time T is set to a 0. Then, the main spindle 8 starts rotation, and the counter starts counting from the 0. At a step 73, the time count is kept on. At a step 74, an rpm of the spindle 8 is checked if it has exceeded a preset rpm for an asymmetry check. Unless it has exceeded the preset rpm, the flow goes to the step 73. When an excessive rpm is checked, a current count of the counter is stored as a check start time, and the flow goes to a step 75. At this step 75, the NC unit 11 samples detection signals from the detectors 50 and processes them to calculate an integrated asymmetricity of the tooling body over a sufficient period until the NC unit 11 stops the sampling, when a current count of the counter is stored as a check finish time. The integrated asymmetricity is then averaged by dividing a time interval equivalent to the check finish time minus the check start time, to determine an asymmetricity of the tooling body, which is compared with a preset reference degree of asymmetry.

In the case of tooling body of FIG. 6, the flow goes from the step 75 to a step 76, where a decision is made such that the tooling body has a significant degree of asymmetry. Then, at a step 77, an upper limit of rpm is lowered from a standard limit (instructed by the instruction at the step 72) to a $2^{nd}$ limit below the $1^{st}$ limit. The flow ends at a step 78.

In the case of tooling body of FIG. 5, the flow goes from the step 75 to a step 79, where a decision is made such that the tooling body has an ignorable or normal degree of asymmetry. Then, at a step, 80, the rpm is set free from the $2^{nd}$ limit, while it is still controlled to be under the instructed standard limit or the $1^{st}$ limit.

The control routine of FIG. 7 may preferably interrupt a control flow of the control routine of FIG. 3, between the steps 31, and 32.

The rpm detector 14 may detect a terminal voltage, drive current and/or field current of the main spindle motor 15 to determine an rpm of the main spindle 8. Or alternatively, as shown in FIG. 4, an external optical detector 90 may be provided to detect the rpm of the main spindle 8 and a detection signal may be input therefrom to the NC unit 11.

The control system of FIG. 1 or an arbitrary part thereof may preferably comprise a set of programs stored in a memory or storage medium.

While preferred embodiments of the present invention have been described using specific terms, such description is for illustrative purposes, and it is to be understood that changes and variations may be made without departing from the spirit or scope of the following claims.

What is claimed is:

1. A control system for a machine tool having a spindle with a tooling body mounted thereon, the control system comprising:
   a first detector for detecting an acceleration time for the tooling body to reach from a rotation start to a predetermined number of revolutions per unit time;
   a controller for controlling a number of revolutions per unit time of the spindle under a first lowered limit when the acceleration time is longer than a reference line;
   a second detector for detecting an asymmetricity of radial forces acting on the spindle; and
   wherein the controller controls the number of revolutions per unit time of the spindle under a second lowered limit when the asymmetricity of radial forces exceeds a reference degree.

2. A control method for a machining tool having a spindle with a tooling body mounted thereon, the control method comprising the steps of:
   detecting an acceleration time for the tooling body to reach from a rotation start to a predetermined number of revolutions per unit time;
   controlling the number of revolutions per unit time of the spindle under a first lowered limit when the acceleration time is longer that a reference time:
   detecting an asymmetricity of radial forces acting on the spindle; and
   controlling the rpm of the spindle under a second lowered limit when the asymmetricity of radial forces exceeds a reference degree.

3. A detection system for control of a machine tool having a spindle with a tooling body mounted thereon, the detection system comprising:
   a first detector for detecting a moment of inertia of the tooling body in terms of an acceleration time for the tooling body to reach from a rotation start to a predetermined, number of revolutions per unit time; and
   a first comparator for comparing the acceleration time with a reference time for a decision on a magnitude of the moment of inertia.

4. The detection system as claimed in claim 3, further comprising:
- a second detector for detecting an asymmetricity of the tooling body in terms of an asymmetricity of radial forces acting on the spindle; and
- a second comparator for comparing the asymmetricity of radial forces with a reference degree for a decision on a degree of asymmetry of the tooling body.

5. A detection method for control of a machine tool having a spindle with a tooling body mounted thereon, the detection method comprising the steps of:
- detecting a moment of inertia of the tooling body in terms of an acceleration time for the tooling body to reach from a rotation start to a predetermined number of revolutions per unit time; and
- comparing the acceleration time with a reference time for a decision on a magnitude of the moment of inertia.

6. The detection method as claimed in claim 5, further comprising the steps of:
- detecting an asymmetricity of the tooling body in terms of an asymmetricity of radial forces acting on the spindle; and
- comparing the asymmetricity of radial forces with a reference degree for a decision on a degree of asymmetry of the tooling body.

* * * * *